United States Patent Office 3,445,009
Patented May 20, 1969

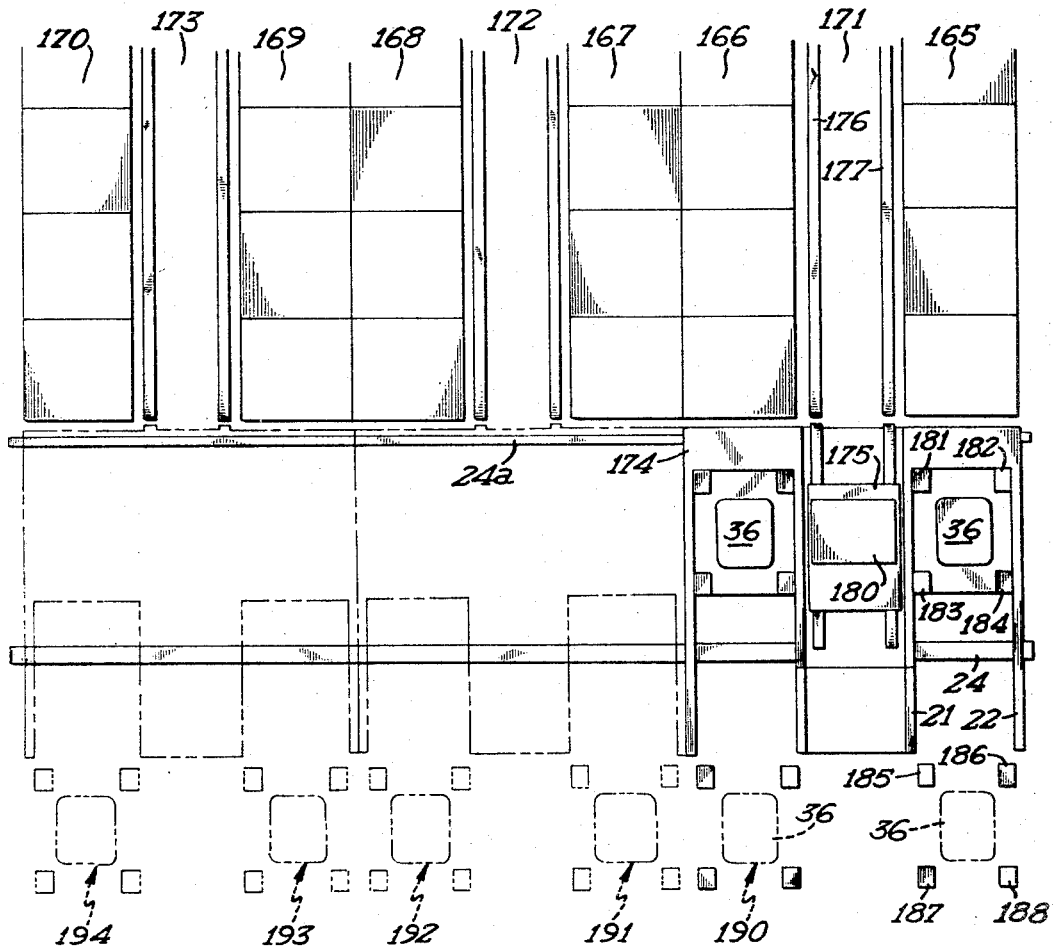
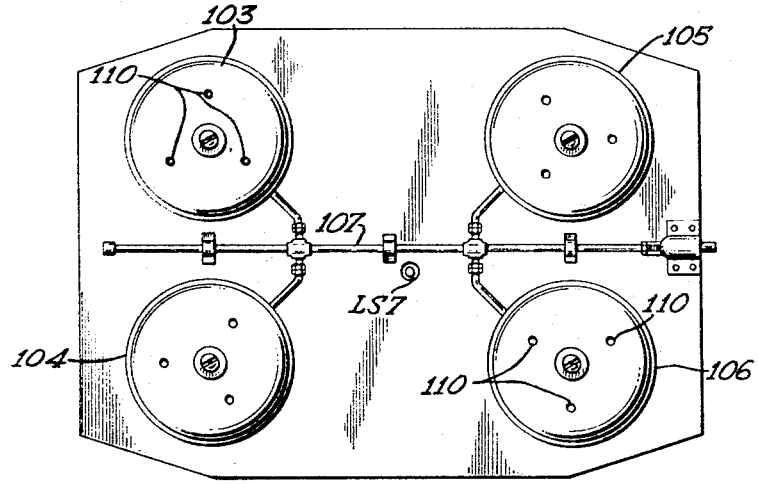
Fig 3
Fig 9
INVENTOR.
ARTHUR R. BURCH

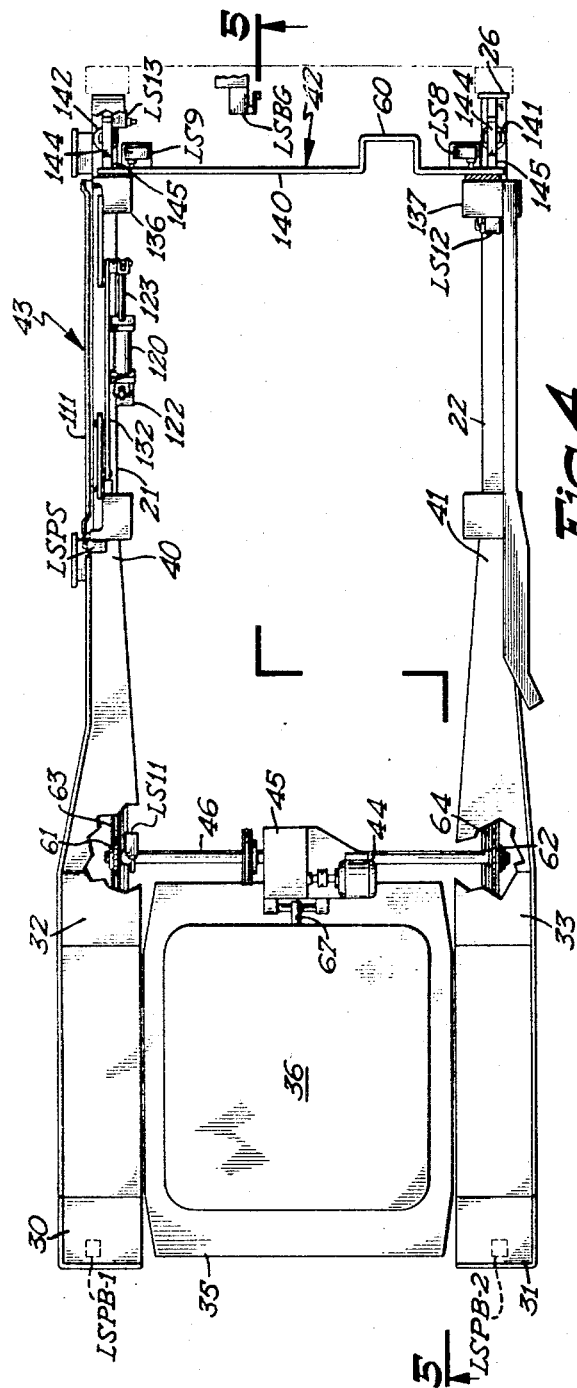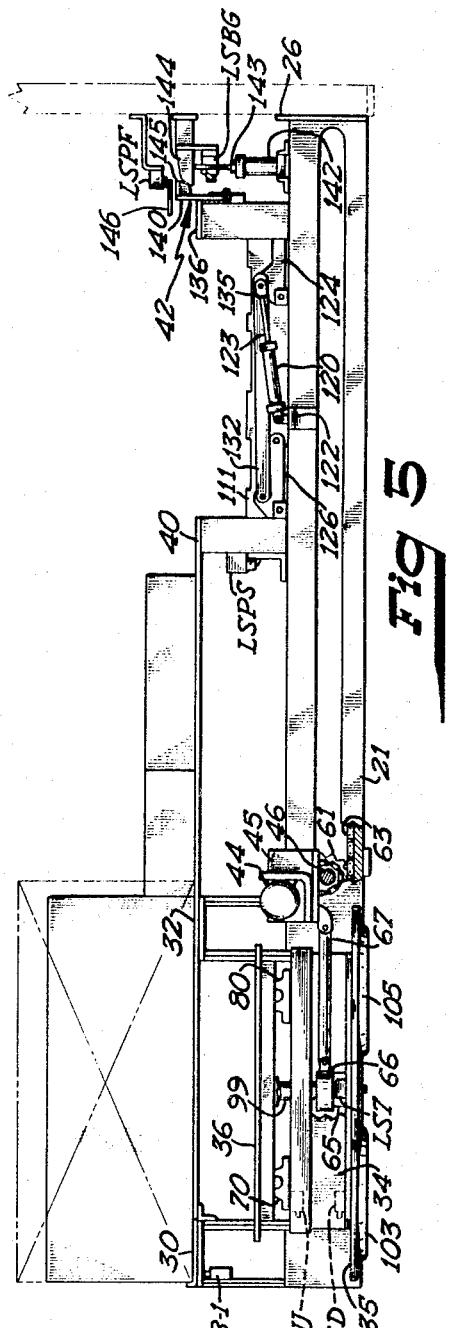

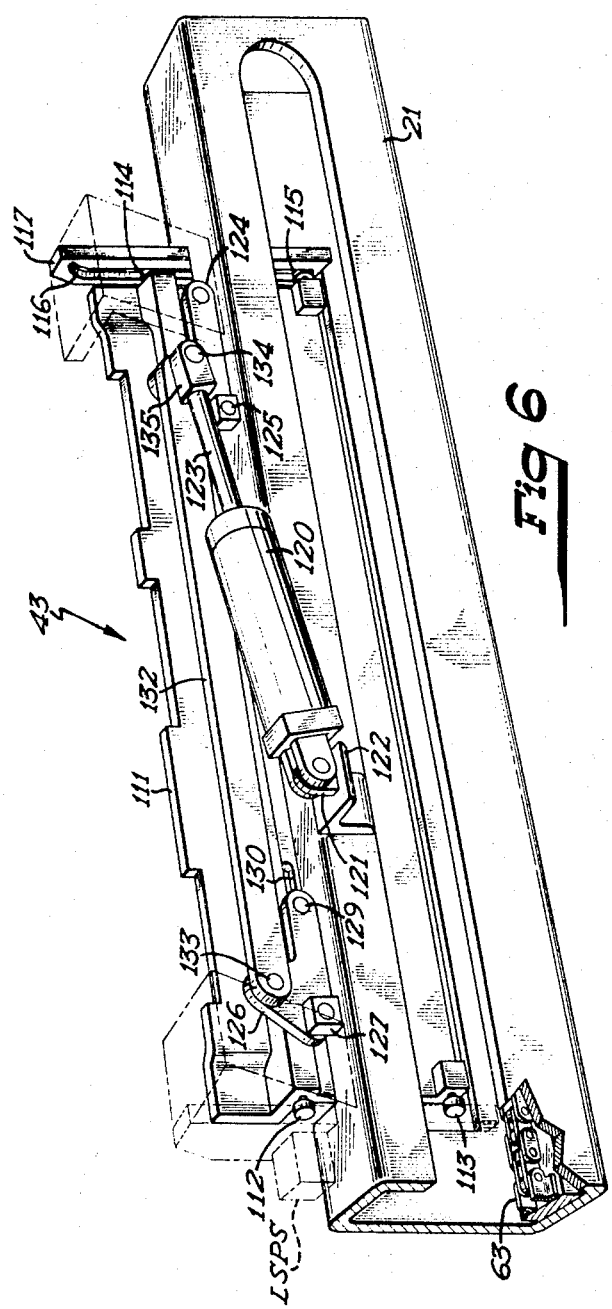

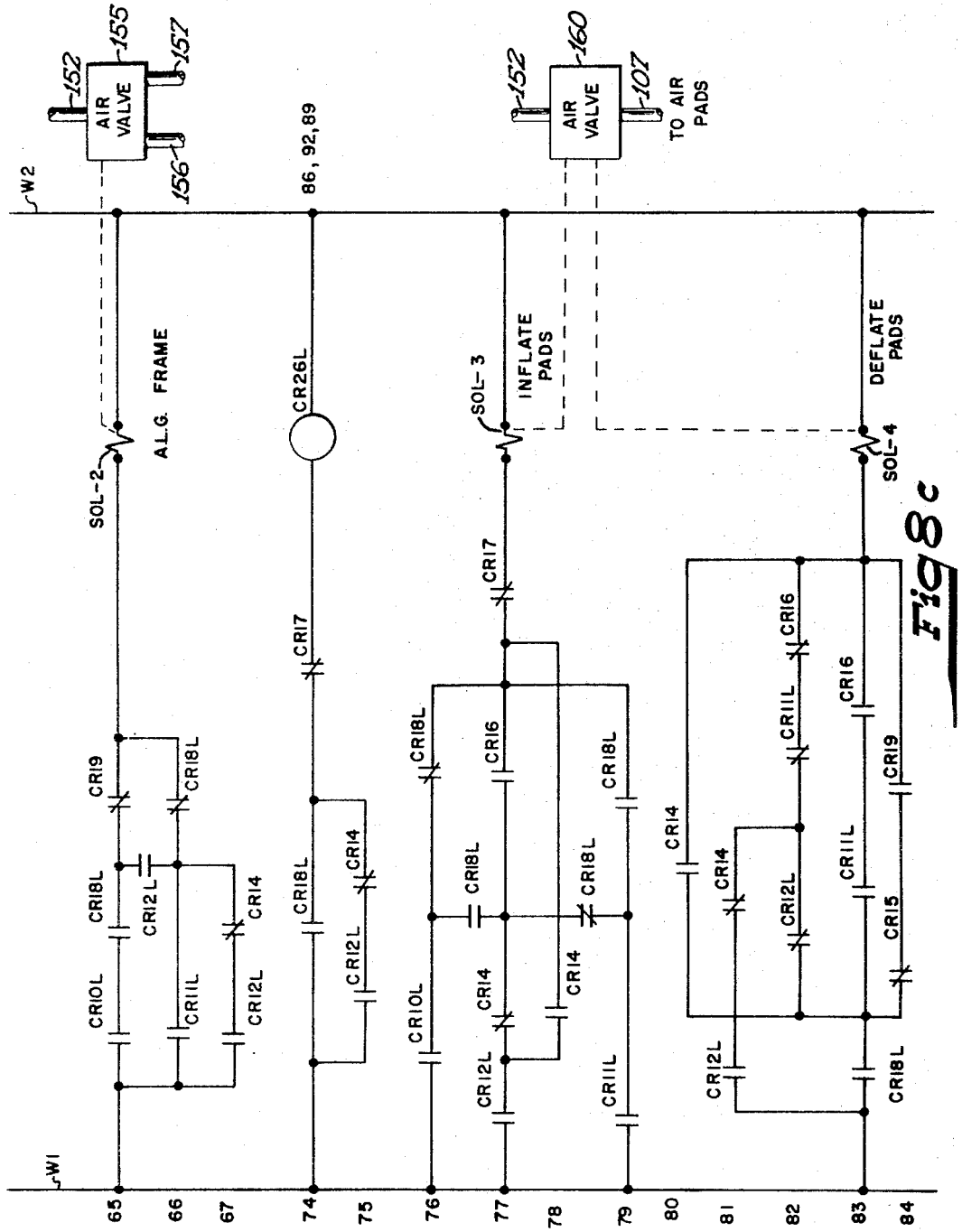

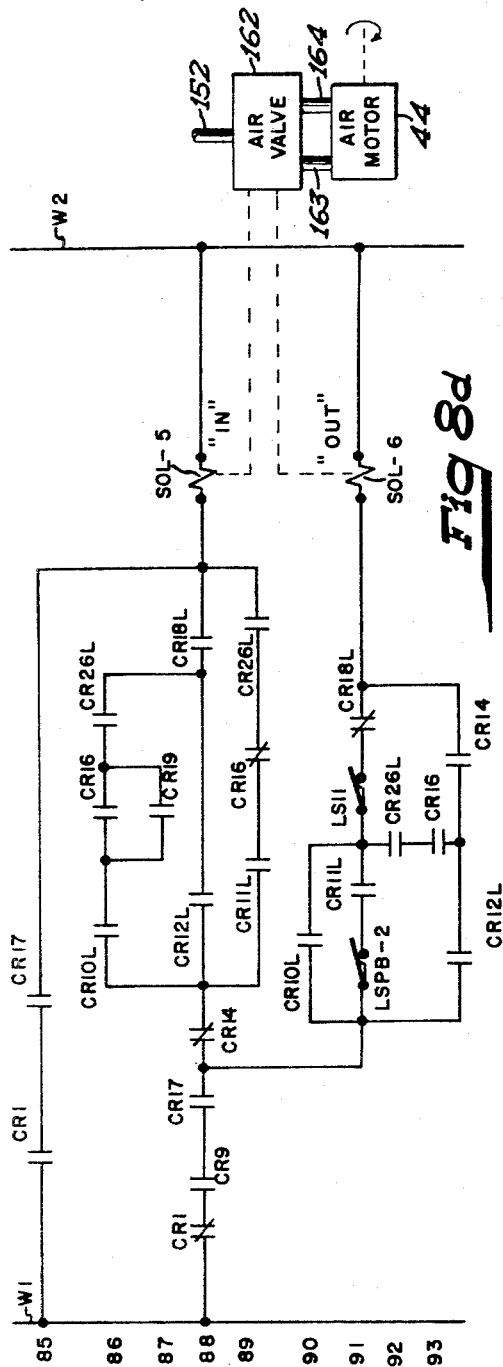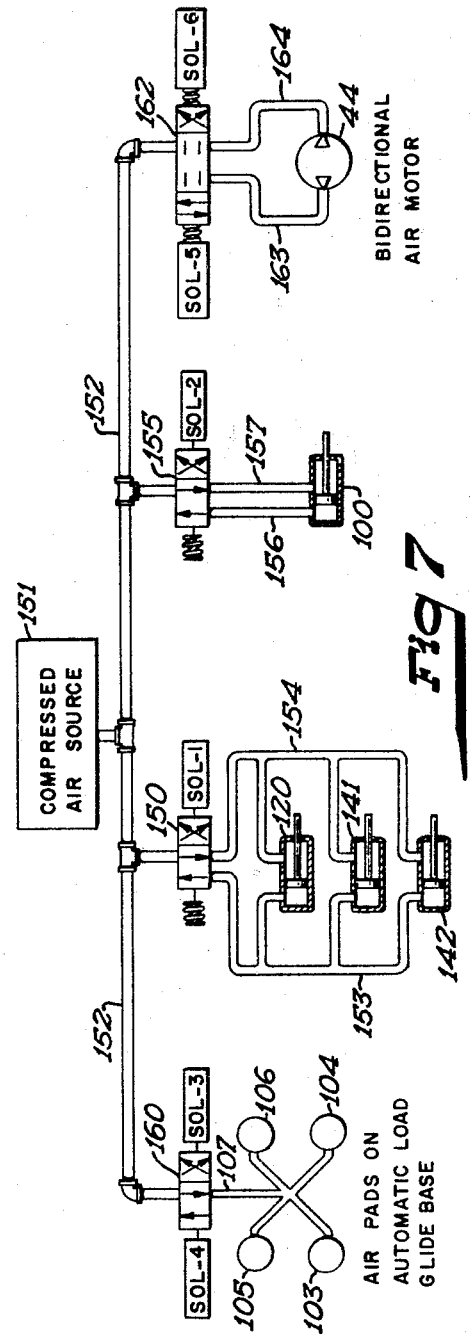

3,445,009
METHOD AND MEANS FOR MOVING MATERIAL-UNITS
Arthur R. Burch, Wayzata, Minn., assignor to Declark, Inc., a corporation of Delaware
Filed Sept. 8, 1966, Ser. No. 577,910
Int. Cl. B65g 63/02, 63/06, 7/06
U.S. Cl. 214—16.4          25 Claims

ABSTRACT OF THE DISCLOSURE

A material handling system that moves materials into bins that are located with aisles therebetween has a transfer vehicle for moving across the ends of the aisles and a stacker vehicle for transferring materials between the transfer vehicle and the bins. The transfer vehicle has a load station accessible to the stacker vehicle and a load station accessible to material handling devices external to the system. Material-units are transferred from the external device load station to the stacker load station on an air film cushion load carrying device.

---

This invention relates to the field of material handling equipment and more particularly to a method and apparatus for automatically moving heavy loads between two different points.

GENERAL DESCRIPTION

This invention is directed primarily to a method and means of moving heavy material units between banking posts where the load may be deposited and a load station or material unit support which is generally carried by a vehicle such as a transfer cart. The transfer cart is used to operate across the ends of the aisles of bins which are formed in vertical columns in horizontal rows with aisles extending between the bins and with an aisle or access area maintained across the ends of the aisles for the transfer cart travel. For a more detailed description of the arrangement and construction of the bins and transfer cart, reference may be made to my co-pending applications entitled Automatic Material-Unit Storage and Method, Ser. No. 543,229, filed Apr. 18, 1966, and Automatic Warehousing Method and Means, Ser. No. 543,224, filed Apr. 18, 1966, and assigned to the same assignee. Generally speaking, the bin arrays are arranged along the aisles and the bins are all the same width and height and depth. The loads to be handled may be of many forms such as pallet supported loads, cartons, boxes, and crates to name a few and will be referred to generally as material units. The transfer cart also permits a stacker to be moved from one aisle to another and thus service a number of aisles with only a single stacker. Situated on each side of the transfer cart, are load stations for picking up a load from a depositing vehicle such as a fork lift or industrial truck and positioning a load at the load station on the transfer cart for pick-up by the stacker.

The stacker of course operates in the aisles between the racks of bins and moves longitudinally away from the transfer cart in the storage aisles. The stacker has an elevator which moves vertically up and down past the faces of the bins or racks and deposits or retrieves a material-unit as required.

This application is directed primarily to the construction of the load station and the method of its operation. Basically, a platform which is movable both horizontally and vertically is generally referred to as an automatic or automated load gliding device in which a cushion of air is used to support the apparatus for horizontal movement and is also used to lift the load a limited amount in a vertical direction, and hereafter referred to as an A.L.G. This invention also utilizes a device which has a plurality of inflatable air pads attached to a platform and with very little effort due to the low coefficient of friction between the air pads and supporting surface, caused by the film of air therebetween, the pallet may be moved in any direction. The pressurized air is supplied to the interior of each of the pads by a compressed air source. Among the unique features of this invention, is the ability of the apparatus to handle large pallet loads in such a manner that there is no relative motion between the pallet and the A.L.G. device platform, thus resulting in a minimum amount of damage in handling loads even though the loads may weigh as high as 5,000 pounds. The A.L.G. device is also constructed so that upon transfer of the stacker from one aisle to another by the transfer cart, the A.L.G. device will support a pallet or material-unit and thus transfer it simultaneously with the transfer cart without placing any great structural load upon the transfer cart itself. By incorporating an apparatus of this type into the transfer cart, the design of the transfer cart may be made considerably more economical than it would have to be if the loads being carried were supported by the transfer cart structure itself.

It is therefore a general object of the present invention to provide an improved method and means of handling material-units between a loading station and a material-unit support.

It is yet another object of this invention to provide a method and apparatus to pickup and align a heavy material-unit for pick-up by an auxiliary piece of equipment such as a stacker.

It is yet another object of the present invention to provide a method and means of moving a heavy material-unit with an air cushion automatically between a loading station and a material-unit support.

It is still a further object of this invention to provide a method and means of receiving and discharging material-units between a movable material-unit support and multiple and fixed banking posts.

It is still a further object of the present invention to provide a method and means of automatically aligning a material-unit to a predetermined reference using a thin film of air for moving the load supporting equipment.

It is another object of the present invention to provide a method and means of using air pads fed by compressed air for lifting and moving a heavy material-unit.

It is yet another object of the present invention to provide means for controlling the inflation and deflation of the air pads under a load support means.

It is another object of the invention to provide a method and means for moving at least one heavy load between aisles while transferring the material handling mechanism but supporting the same by a thin film of air without burden to the material handling mechanism.

These and other objects and advantages of my invention will more fully appear from the following description, made in connection with the accompanying drawings, wherein like reference characters refer to the same or similar parts throughout the several views, and in which:

FIG. 3 is a diagrammatic plan view showing the relative placement of a plurality of banking posts used with the material handling apparatus;

FIG. 4 is a plan view of the load station on the right hand side of the transfer cart showing the placement of the control circuit limit switches;

FIG. 5 is an elevational side view of the load station taken along section lines 5—5 as found in FIG. 4;

FIG. 6 is an isometric view of the pallet stop assembly;

FIG. 7 is a pneumatic schematic showing the driving and control elements connected thereto;

FIGS. 8a through 8d show the control and logic schematic for controlling the automatic load glide; and FIG. 9 is a bottom plan view of the platform carrying the air pads.

Figure 1:
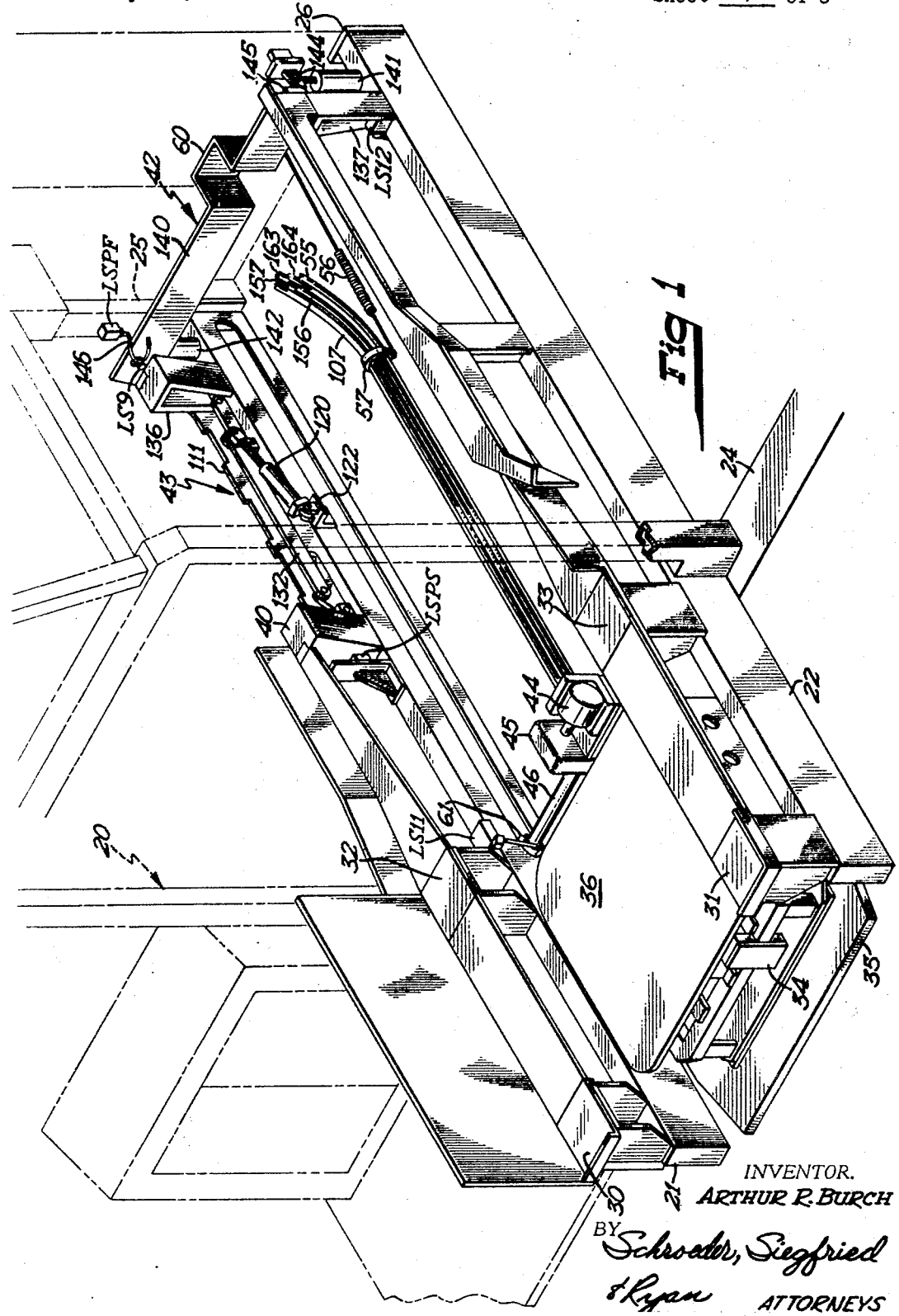
FIG. 1 is an isometric view of the right hand side of the transfer cart showing the A.L.G. device in an extended position.

As seen in FIG. 1, a transfer cart 20 is supported upon rails to move across the ends of the aisles and is used to support a pair of guide channels 21 and 22 which may be designated the inboard and outboard channels respectively. Inboard channel 22 is supported by a wheel (not shown) which rolls over an embedded metal channel 24. For more details on this arrangement, reference may be made to the two aforementioned co-pending applications. Channels 21 and 22 are secured to a back portion 25 and 26 respectively of the transfer cart. A banking station is formed with four banking posts 30 through 33 which are at the most forward position of the two boom like channels 21 and 22. A material-unit is placed upon these banking posts for pick-up by an A.L.G. device 34 or may be used to receive a load from a fork lift or similar material handling structure. A.L.G. device 34 has an air pad platform 35 situated at its lowermost position and a load support platen 36 at the uppermost part upon which a load is supported. A pair of guide rails 40 and 41 respectively are formed on the inboard and outboard portions of the load station directly above channels 21 and 22 respectively to help guide a material-unit to the rear of channels 21 and 22 to be deposited at a load support station having a back gate 42 and a lateral pallet stop 43 situated so that when the material-unit is brought to the rearward position of the load station where it may be picked up by the lateral platform of the stacker, the material-unit is aligned by encountering back gate 42 and is kept in alignment with guide 40 by pallet stop 43. As shown in FIG. 1, pallet stop 43 is in its lowered position and a further explanation will be forthcoming with respect to its operation in FIGS. 2 and 6 in addition to that shown in FIG. 1. Situated behind A.L.G. device 34 is an air motor 44 which is connected to a gear train 45 that drives a shaft 46. Five pneumatic hoses 107, 156, 157, 163 and 164 supply compressed air to the different control elements of A.L.G. device 34 along with an electrical cable 55, the hoses and cables being held under tension by a spring 56 which is anchored at the back part of the load station and which is wrapped around the hoses and the electrical cable by a collar 57. When the A.L.G. device 34 is at its rearward position, the air hoses and electrical cable 55 fit into the "notch" 60 formed in the back gate 42 to accommodate them so that a material-unit may bear against the back gate 42 and not be obstructed. Air motor 44 is a bi-directional air motor and may be of the type such as model No. 4AM–NRV–22A manufactured by the Gast Manufacturing Corporation, Benton Harbor, Mich.

Figure 2:
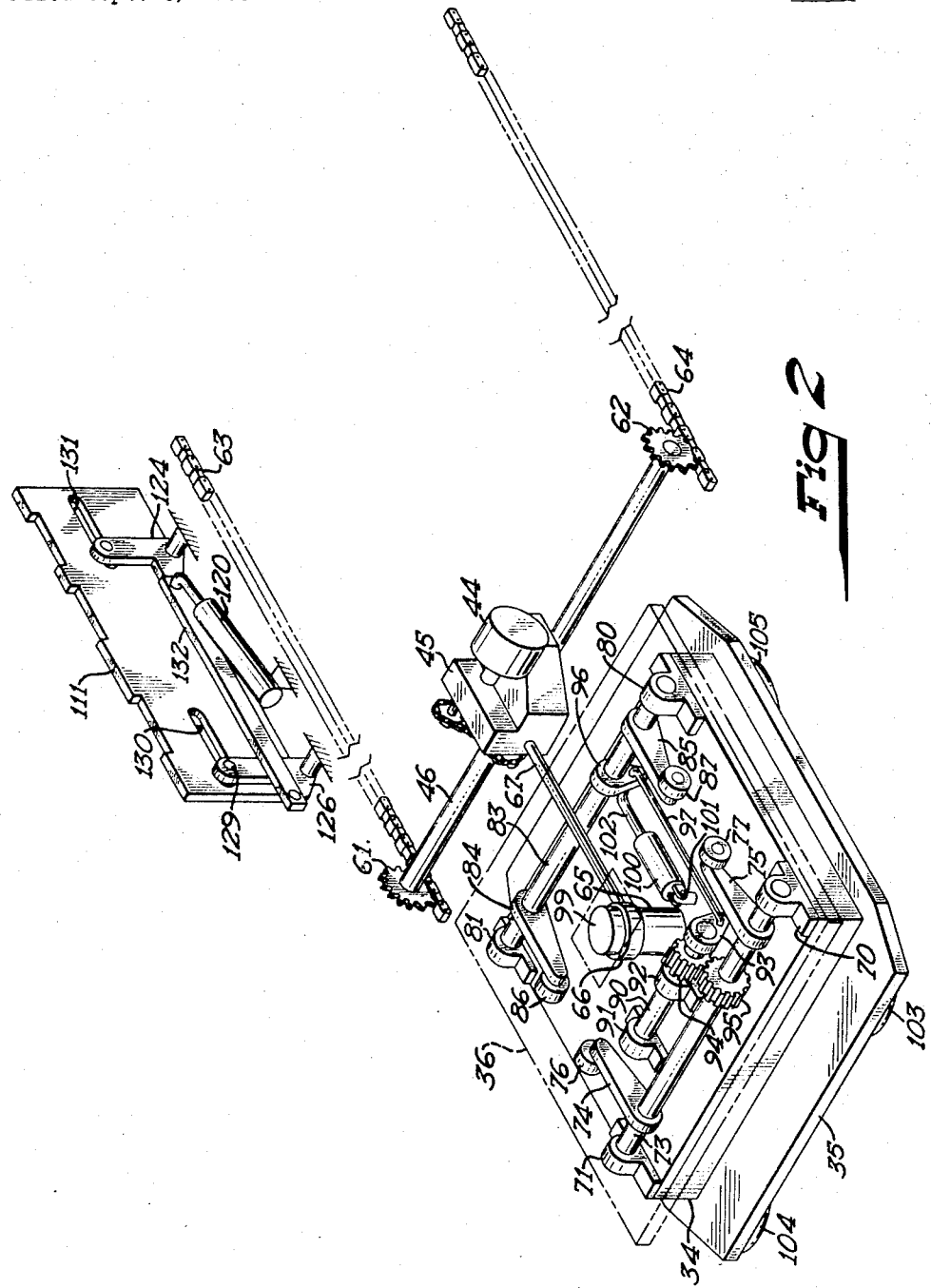
FIG. 2 is a diagrammatic view of the A.L.G. device showing the driving mechanism of the right hand load station.

In FIG. 2, it will be seen that shaft 46 is connected to a pair of spur gears 61 and 62 which engage a pair of chains 63 and 64 respectively. The chains are secured to the lower portion of channels 21 and 22 much like a gearing rack so that when shaft 46 is rotated, the shaft will also move translationally between the chains.

Secured in the center of the A.L.G. device 34 is a hollow upstanding post 65, about which a collar 66 is fastened. The collar 66 is connected to motor 44 and gear train 45 through a connecting bar 67. Thus it will be seen that as motor 44 and gear train 45 move along chains 63 and 64, the A.L.G. device 34 and the air pad platform 35 will move with it.

Situated on the platform of the A.L.G. device 34 are a pair of pillow blocks 70 and 71 which support a shaft 73 for rotation. Secured to shaft 73 near each end thereof are a pair of arms 74 and 75, upon the ends of which are rotatably secured, a pair of rollers 76 and 77 respectively. In a similar manner, on the rearward side of the platform of A.L.G. device 34, is a pair of pillow blocks 80 and 81 which support a shaft 83 for rotation. Secured to shaft 83 near the ends thereof are a pair of arms 84 and 85 to which are rotatably secured a pair of rollers 86 and 87 respectively. So that the arms will move vertically in the same direction, another shaft 90 is rotatably secured to said platform by a pair of pillow blocks 91 and 92. Secured to the end of shaft 90 is a connecting link 93 and rotatably connecting shafts 90 and 73 are a pair of gears 94 and 95 respectively which are secured to the shafts. Shaft 83 has a link 96 secured thereto and connecting links 96 and 93 is a rod 97. An air cylinder 100 is secured to the said platform by a lug 101 and the other end of the cylinder has a piston connecting rod 102 which is also connected to link 96. It will be seen that as air is applied to cylinder 100, and the connecting rod drawn inwardly, that links 96 and 93 are rotated clockwise and through gears 94 and 95, arms 74 and 75 are rotated counterclockwise, it thus being apparent that all arms 74, 75, 84, and 85 move upwardly. As long as cylinder 100 has piston rod 102 drawn inwardly, the arms remain in a vertical position and as they move upwardly, a post 99 which slides vertically within hollow post 65 prevents a horizontal movement of the load support or platen 36. In other words, when the arms are moved upwardly, the platen 36 is cammed upwardly and remains in such a position as long as cylinder 100 is maintained with the piston rod drawn inwardly. It will also be recognized that when compressed air is applied to the other side of the piston that the reverse process will take place and the platen will move to its downward position.

FIG. 9 shows a bottom view of the air pad platform 35 which has four air pads 103 through 106 fastened thereto. The air pads are connected by a suitable compressed air conduit assembly 107. For a more detailed description of the air pads and their operation, reference is made to a co-pending application entitled "Material Handling Device," Ser. No. 503,175, filed on Oct. 23, 1965, and assigned to the same assignee. Basically, the air pads are formed by an outer frame member which is somewhat dish shaped and an inner frame member over which is formed a flexible sheet held between the adjacent rim portions of the two frame members. Pressurized air is directed into the air pads and a thin film of air is created under the air pads by allowing the air to escape through a plurality of holes such as holes 110 shown in air pad 103. The air flows through the holes flowing generally radially in an outward direction and forms an air film between the two surfaces.

In FIGS. 6 and 2, pallet stop 43 is shown in more detail wherein a lateral pallet stop gate 111 comprises a metal plate which may be moved vertically to line up with the vertical edge of inboard guide 40. This is accomplished by gate 111 having four rollers 112 through 115 rotatably secured at the ends thereof and which follow grooves for controlling the vertical motion such as a groove 116 in a guide block 117. To cause the vertical movement of gate 111, another air cylinder 120 is secured to the edge of channel 21 by suitable means such as a lug and bracket 121 and 122 respectively. The cylinder 120 has a push rod 123 which extends therefrom and is rotatably connected to an arm 124. Arm 124 is rotatably secured to a lug 125, the lug being secured to the upper portion of channel 21. Situated at the end of arm 124 is a roller (not shown). Near the other end of the lateral pallet stop gate is a similar arm 126 which is rotatably secured at one end to a lug 127 which is secured to the top of channel 21 in a manner like that of lug 125. Connected to the opposite end of arm 126 by means of a pin 129, is a roller (not shown). The roller engages a slot 130 which extends horizontally in lateral gate 111 and a similar slot 131 and roller arrangement are used with arm 124 so that when the arms are rotated counterclockwise, gate 111 is moved vertically upward and guided by the slots in the end brackets. A bar 132 is rotatably connected to arms 126 and 124 by suitable means such as a pair of pins 133 and 134. Pin 134 also connects a clevis 135 to arm 124, clevis 135 being formed on the end of push rod 123. Thus as rod 123 is drawn inwardly into cylinder 120, the gate 111 is moved upwardly into its most vertical position. Upon compressed air being admitted to the other side of the cylinder, the lateral pallet stop returns to its lowermost position. FIG. 2 shows the lateral pallet stop schematically in its most vertically extended position.

Back gate 42, as seen in FIGS. 1 and 5, is supported by a pair of back posts 136 and 137 which extend vertically above channels 21 and 22 respectively. The stop gate or back gate 42 is formed from an elongated channel member or plate 140 which has the "notch" 60 described previously formed therein to accommodate the hoses and wires. Plate 140 is hinged to posts 136 and 137 so that plate 140 may tilt backwardly and downwardly away from the load station. A pair of air cylinders 141 and 142 are located to the rear of posts 137 and 136 respectively and extend upwardly. A plunger 143 extends upwardly from cylinder 142 and has a cam 144 connected thereto. Cam 144 engages another cam 145 which is secured to the back of plate 140. Cams 144 and 145 have slanting upper and lower surfaces respectively so that as plunger 143 moves upwardly, cam 144 engages cam 145 and causes the back gate to swing into a vertical position. Upon cylinder 142 having compressed air applied to the other side of the piston contained therein, plunger 143 is moved downwardly and the back gate is allowed to swing to the rear of the load station. Another pair of cams operate with a cooperating plunger for air cylinder 141 in the same manner as just described for that of cylinder 142. In other words, a cylinder is used on each end of the back gate to cause it to move vertically from its rest position which is tilted backwardly and downwardly.

In order to provide the proper control for the operation of the load glide, limit switches are provided in the control circuits and these will be described in more detail later, relative to the electrical operation thereof. Physically, with reference to FIGS. 4 and 5, a pair of limit switches LSPB–1 and LSPB–2 are located respectively below banking posts 30 and 31. The upper part of the banking post of each of the pair just described has a cap or plate portion which has upturned outer edges and is spring loaded and pivotally supported so that upon a load being deposited upon these plates, the pressure actuates the limit switches just described. To detect the most outward travel of the load glide assembly, a limit switch LS–11 is located in the path of movement of shaft 46 and is tripped thereby. During the Recycle mode of operation, a limit switch LS–12 which is situated a short distance in an outwardly direction from the Home station is tripped by shaft 46 also. To indicate when a pallet or material-unit has been squared against back gate 42, a pair of limit switches LS–8 and LS–9 detect the presence of the material-unit bearing squarely against the back gate 42. Another limit switch LS–13 indicates when the load glide assembly is at the Home station and also engages shaft 46. Limit switch LSPF is secured to the back portion of the load station and extends over the top of the back gate and has a curved actuating arm 146 which may be actuated either by a load being deposited at the load station by the load glide assembly or by a load being deposited from a lateral position by a mechanism such as the lateral platform of a stacker. It is used to indicate that a pallet or material-unit is at the load station. Another limit switch LSBG is actuated when the back gate is down and is located below and behind the back gate. Another limit switch LSPS is located to detect the position of the lateral pallet stop gate 111 to tell whether the gate is up or down. Situated upon air pad platform 35 is a limit switch LS–7 which is actuated when the air pads are inflated or deflated. Additionally, a pair of limit switches LS–6U and LS–6D indicate when the platform 36 with respect to platform 35 is either up or down respectively.

Reference is now made to FIGS. 8a through 8d which show the electrical schematic for the control circuit. A reference is also made to co-pending application Ser. No. 543,229 filed Apr. 18, 1966 entitled "Automatic Material-Unit Storage and Method" and assigned to the same assignee for a further explanation of the overall control circuit for the transfer cart operation. As described in my co-pending application, the line number indicated on the left hand side of the logic circuit drawing makes reference to the electrical circuit to the right containing a number of elements. On the right hand side of the circuit diagram are line numbers for which a relay will have contacts, and where the number is underlined it indicates the contacts are normally closed. The numbers not underlined indicate the contacts are normally open and are closed upon energizing the control relay. Certain alternating current relays, while having one set of contacts, have two different coils, one being known as a "latching" coil and the other being an "unlatching" coil. When voltage is applied to a latching coil with the unlatching coil energized, the relay operates like a single coil type relay and is "pulled in." When the unlatching coil is de-energized, and a voltage is applied to the latching coil and de-energized, the relay remains in a mechanically latched state and acts as if it was "pulled in." When the relay is mechanically latched and the latching coil is de-energized, energizing the unlatching coil causes the relay to mechanically unlatch and "drop out." As shown in the logic circuits, the latching coils are associated with control relays and the unlatching coils are associated with unlatching relays although they are generally a single relay having dual coils and mechanically connected so as to perform the functions just described.

Certain relays of the apparatus have contacts which are used to arm the transfer circuit to initiate a transfer function and this is shown primarily in line 7. An alternating current conductor W–1 and its corresponding ground reference W–2 are connected to an alternating source of voltage. A series circuit, at line 7, is connected between wires W–1 and W–2 comprising an initiate transfer switch, normally open relay contacts CR–15L, CR–15R, and CR–5, and a pair of normally closed relay contacts CR–7 and a latching relay CR–1L. The main purpose of showing this particular circuit is that control relay contacts CR–15L and CR–15R (the L and R indicate respectively the left and right hand A.L.G. assemblies of the apparatus) are used to prevent a transfer of the transfer cart from one aisle to another unless the said A.L.G. assemblies are in the "HOME" station or position. Unless otherwise indicated, all of the circuits following are connected between wires W–1 and W–2. In line 31, a start switch S–1 is connected to a control relay CR–9. In line 32, connected in parallel with switch S–1, is an emergency stop switch S–2 connected in series with a pair of normally open relay contacts CR–9. In line 34, limit switch LS–8 is connected in series with a pair of normally open relay contacts CR–13, normally closed relay contacts CR–11L and CR–12L, a normally open load switch S–3, and a latching relay CR–10L.

In line 35, a series circuit is formed by normally open relay contacts CR–18L, CR–14, and an unlatch control relay CR–10UNL. Connected in parallel with unlatch control relay CR–10UNL is a pair of unlatch control relays CR–26UNL and CR–12UNL. In line 38, a series circuit is completed by a normally closed limit switch LSPB–1, a normally open push button switch S–4, a pair of normally open relay contacts CR–13, normally closed relay contacts CR–10L and CR–12L, and a latching control relay CR–11L. Connected in parallel with limit switch LSPB–1 and switch S–4 are a pair of normally open relay contacts CR–1L. In line 40, unlatch control relay CR–11 is connected in series with normally open relay contacts CR–14 and CR–18L. In line 42, a recycle switch S–5 (normally open) is connected in series with normally closed relay contacts CR–10L, CR–11L and CR–19 and normally open relay contacts CR–13 and a latching control relay CR–12L. In line 44, a reed switch RS–11 is connected in series with a control relay CR–13. Reed switch RS–11 is controlled through an electromagnet S.EM–2 which is on the stacker that is driven onto the transfer cart and acts as an interlock which is energized when a deposit of a load from the stacker is to be made at a load station.

In line 45, a series circuit is completed by normally open limit switch LS–13, and a control relay CR–14, limit switch LS–13 being closed when the platform A.L.G. device 34 is in the "HOME" position.

Figure 8A:
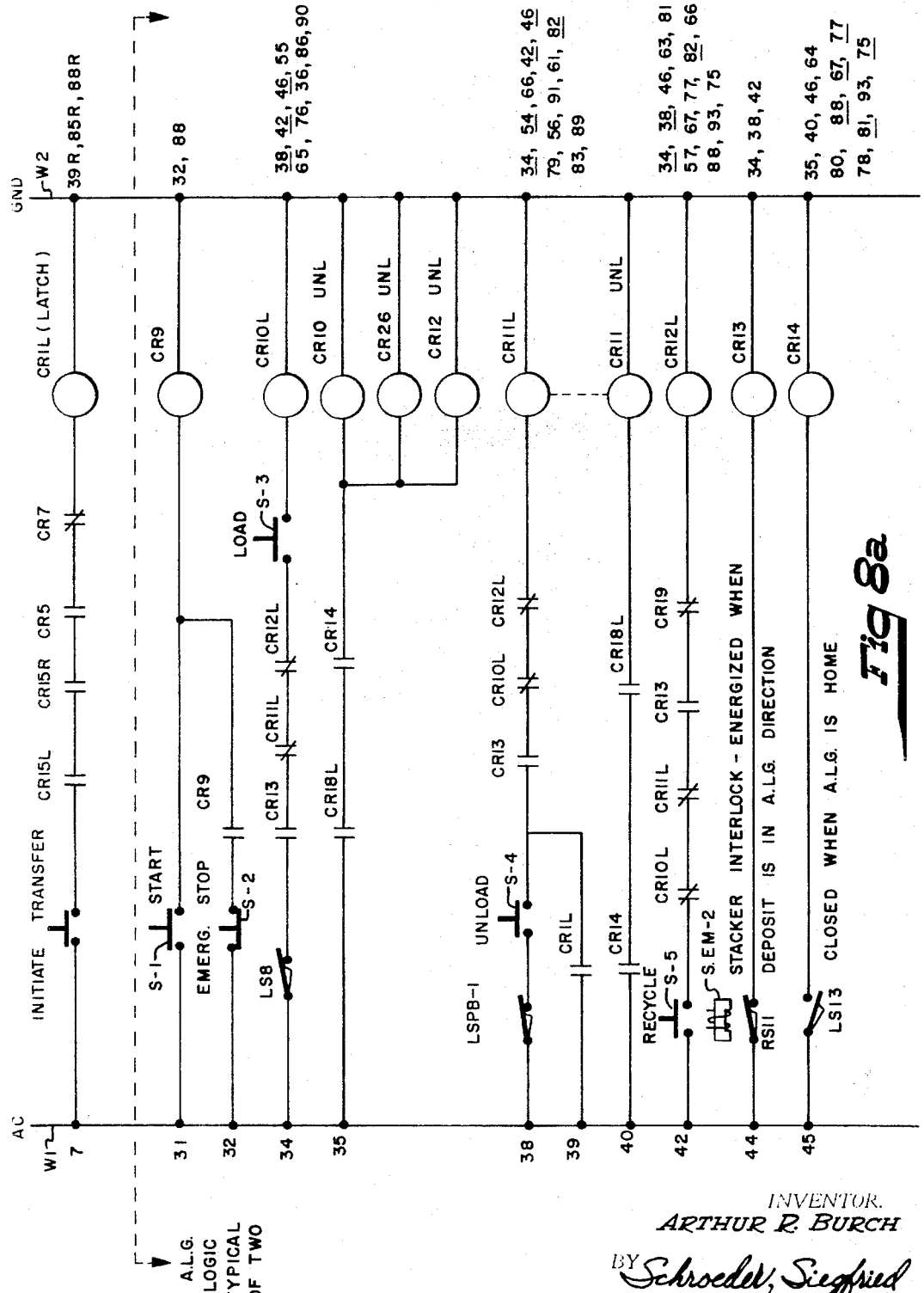
Figure 8B:
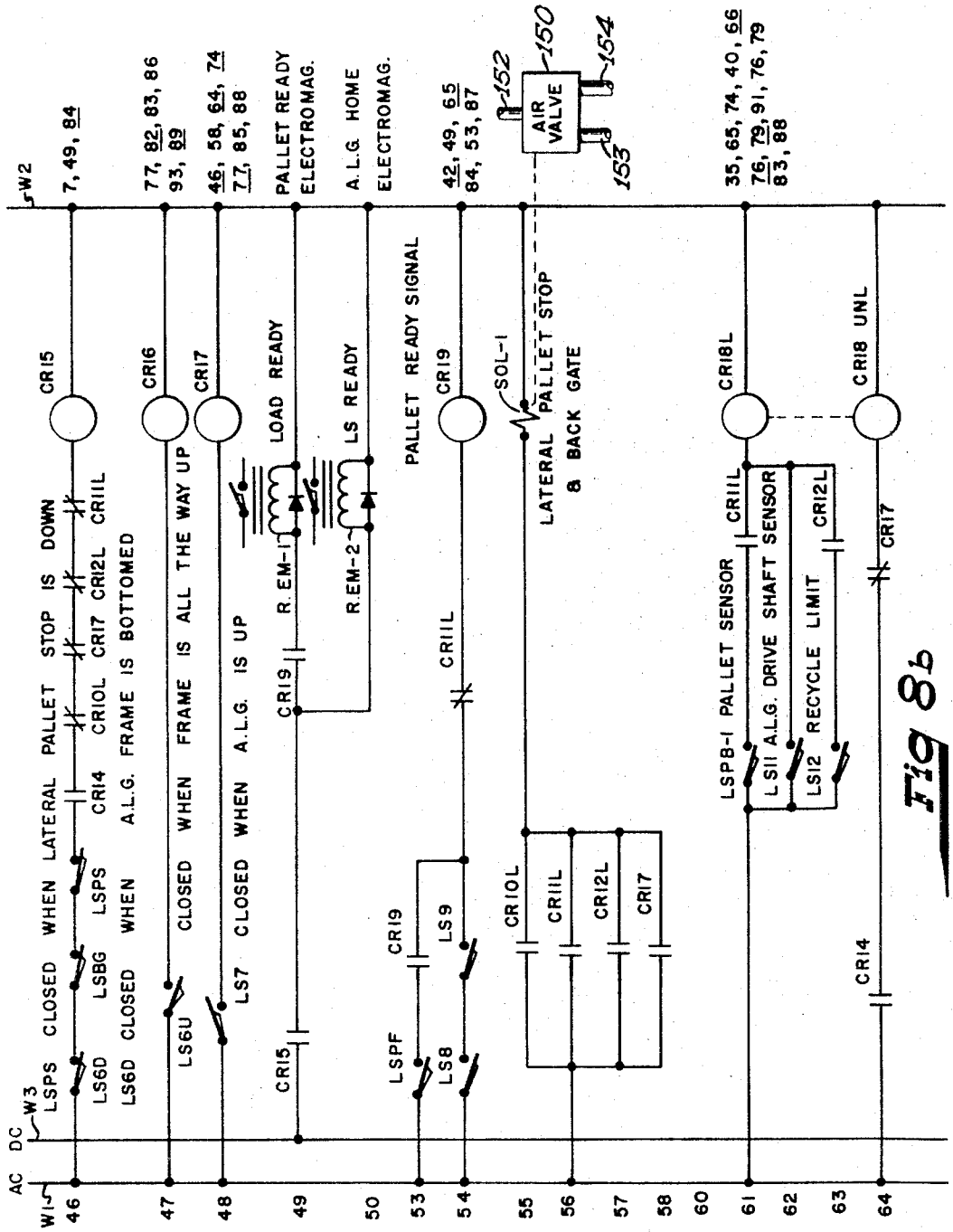

Reference is now made to FIG. 8b which includes, in addition to the conductors pointed out hereinbefore, another conductor W–3 which supplies a direct current to the control relay circuit, the other conductor having the same reference as the alternating current ground reference W–2. In line 46, a series circuit is completed through three limit switches LS–6D, LSBG, LSPS, normally open relay contacts CR–14, normally closed relay contacts CR–10L, CR–17, CR–12L, CR–11L, and a control relay CR–15 which is energized when all the gates and the A.L.G. device 34 are in the down position and at the "HOME" station. In line 47, a series circuit is completed by a control relay CR–16 and a normally open limit switch LS–6U, which is closed when the platen 36 is all the way up. In line 48, a series circuit is completed by limit switch LS–7 and a control relay CR–17 which is energized by the limit switch when the air bags are inflated. In line 49, a series circuit is completed between conductor W–3 and conductor W–2 (a direct current circuit), the series circuit comprising normally open relay contacts CR–15 and CR–19, and an electromagnet R.EM–1, across which is connected a properly polarized suppression diode, to indicate when the load is ready for pick-up. The electromagnet closes an appropriate reed switch in the stacker circuit indicating the condition just described. Connected in parallel with normally open relay contacts CR–19 and electromagnet R.EM–1, is another electromagnet R.EM–2 and its accompanying diode, which indicates that the load station is ready and in the "HOME" position. Electromagnet R.EM–2 also energizes a reed switch in the stacker control circuit.

In line 54, limit switches LS–8 and LS–9, which are normally open, are connected in series with normally closed relay contacts CR–11L and a control relay CR–19 connected between conductors W–1 and W–2. Control relay CR–19 is actuated when the pallet is square against the back gate. Connected in parallel with limit switches LS–8 and LS–9, is a series circuit formed by limit switch LSPF and a pair of normally open relay contacts CR–19. It will be remembered that limit switches LS–8 and LS–9 are connected physically to the back gate and will therefore fold downwardly with the back gate and thus the locking circuit is created through the pallet feeler switch LSPF and control relay contacts CR–19 to keep control relay CR–19 energized. In line 55, a series circuit is formed through a pair of normally open relay contacts CR–10L and a solenoid coil SOL–1. Solenoid SOL–1 is used to control an air valve 150. Air valve 150 is supplied by a compressed air source 151 (FIG. 7) through a mainline 152. Air valve 150 has two output lines 153 and 154 to alternately supply compressed air through either line 153 or 154. Air valve 150 is solenoid controlled and has a spring for returning the valve to a particular mode of operation when unenergized. This valve and other valves to be described are valves presently being manufactured by the Bellows-Valvair Company, Akron, Ohio. Compressed air line 153 is connected to one side of lateral pallet stop cylinder 120 and to the same side of cylinders 141 and 142. The other compressed air line 154 is connected to the opposite side of cylinders 120, 141 and 142 to provide appropriate control to each of the air cylinders described previously. Connected in parallel with normally open relay contacts CR–10L are three other normally open relay contacts CR–11L, CR–12L, and CR–17. In line 61, a series circuit is formed through a second section of limit switch LSPB–1, which is normally open, a pair of normally open relay contacts CR–11L and a control relay CR–18L. The limit switch just described stops the load glide from moving further in an outwardly direction during an unload mode of operation before the drive shaft 46 strikes limit switch LS–11 thus allowing the deposit to be made without a jerking or sudden stop motion. Connected in parallel with limit switch LSPB–1 and control relay contacts CR–11L are a pair of circuits, the first having only limit switch LS–11 connected thereto and the second circuit having limit switch LS–12 connected in series with a pair of normally open relay contacts CR–12L. During a pick-up mode of operation the platform of A.L.G. device 34 moves further out under the pallet before a pick-up is attempted where its forward motion is stopped by limit switch LS–11, the operation being described later in more detail. In line 64, a series circuit is completed through a pair of normally open relay contacts CR–14, a pair of normally closed relay contacts CR–17, and an unlatching relay CR–18UNL. In line 65, a series circuit is formed through normally open relay contacts CR–10L and CR–18L and normally closed contacts CR–19 and a solenoid coil SOL–2. Solenoid SOL–2 is used to control an air valve 155 which has compressed air fed to input line 152 and has a pair of compressed air output lines 156 and 157. Air valve 155 is of the same type and has the same function operation as that of air valve 150 just described. Solenoid valve 155 has its output lines 156 and 157 connected to air cylinder 100 to control the position of the platen 36. In line 66, connected in parallel with normally open relay contacts CR–10L and CR–18L in line 65, are normally open contacts CR–11L and CR–12L. Connected to the junction of contacts CR–11L and CR–12L is one terminal of a pair of normally closed relay contacts CR–18L and the other terminal is connected between normally closed relay contacts CR–19 and solenoid SOL–2. Connected in parallel with control relay contacts CR–11L (in line 67) is a series circuit formed from a pair of normally open relay contacts CR–12L and a pair of normally closed relay contacts CR–14. In line 74, a series circuit is formed with a pair of normally open relay contacts CR–18L and a pair of normally closed relay contacts CR–17 and a control relay CR–26L. Control relay CR–26L insures that the air bags are inflated before the load glide starts its movement towards the "HOME" station from the banking posts. In line 75, connected in parallel with control relay contacts CR–18L (line 74) is a series circuit formed from a pair of normally open relay contacts CR–12L and a pair of normally closed relay contacts CR–14. In line 77, a series circuit is formed between conductors W–1 and W–2 through a pair of normally open relay contacts CR–12L, a pair of normally closed relay contacts CR–14, a pair of normally open relay contacts CR–16, a pair of normally closed relay contacts CR–17 and a solenoid coil SOL–3. Solenoid SOL–3 is mechanically connected to an air valve 160 which has compressed air fed to its input through line 152. Connected in parallel with relay contacts CR–12L and CR–14 in line 77, are normally open relay contacts CR–10L and CR–18L in line 76. Connected between the junctions of relay contacts CR–10L and CR–18L (line 76) and CR–16 and CR–17 (line 77) is a pair of normally closed relay contacts CR–18L. Connected in parallel with relay contacts CR–14 and CR–16 (line 77) is a pair of normally open relay contacts CR–14 (line 78). Furthermore, connected in parallel with relay contacts CR–12L and CR–14 of line 77, are a pair of normally open relay contacts CR–11L and a pair of normally closed contacts CR–18L connected in series therewith (line 79). Connected between the junction of relay contacts CR–11L and CR–18L (line 79) and relay contacts CR–16 and CR–17 (line 77) are a pair of normally open relay contacts CR–18L (line 79). Solenoid operated valve 160 is of the type that stays in the last position energized and thus the output thereof is applied through line 107 to the air pads to either allow full flow of the compressed air or cut off the compressed air as will be further described. In line 83, a series circuit is completed between conductors W–1 and W–2 through normally open relay contacts CR–18L, CR–11L, CR–16, and a solenoid coil SOL–4. Solenoid coil SOL–4 is mechanically connected to air valve 160 to complete the action just described. Connected in parallel with relay contacts CR–11L and CR–16, is a pair of normally open relay contacts CR–14 (line 80) and connected in parallel with relay contacts CR–14, are normally closed relay contacts CR–12L, CR–11L, and CR–16 (line 82). Connected between the junction of relay contacts CR–12L and CR–11L (line 82) and conductor W–1 is a pair of normally open relay contacts CR–12L and a pair of normally closed relay contacts CR–14 (line 81). Also, in line 84, a series circuit formed by normally closed relay contacts CR–15 and normally open relay contacts CR–19, is connected in parallel with control relay contacts CR–11L and CR–16 in line 83.

In FIG. 8d, there is shown the control circuits for air motor 44, which is connected to an air valve 162 through a pair of compressed air lines 163 and 164. Air valve 162 is connected to the compressed air inlet line 152. Connected in line 88 between conductors W–1 and W–2, is a series circuit formed by normally closed relay contacts CR–1, normally open relay contacts CR–9 and CR–17, normally closed relay contacts CR–14, normally open relay contacts CR–12, CR–18L and a solenoid coil SOL–5. Solenoid coil 5 is mechanically connected to air valve 162 to drive air motor 44 towards the "HOME" station or in the "IN" direction. In line 85, normally open relay contacts CR–1 and CR–17 are connected in series between conductor W–1 and solenoid coil SOL–5. In line 86, a series circuit is formed from normally open relay contacts CR–10L, CR–16, and CR–26L, all of which are connected in parallel with relay contacts CR–12 in line 88. Connected in parallel with contacts CR–16 of line 86, is a pair of normally open relay contacts CR–19 (line 87). Connected in parallel with normally open relay contacts CR–12L and CR–18L (line 88) is a series circuit formed of normally open relay contacts CR–11L, normally closed contacts CR–16 and normally open relay contacts CR–26L. Another circuit is formed in line 91 between conductor W–2 and the junction between control relay contacts CR–17 and CR–14 of line 88, by a series circuit formed of limit switch LSPB–2 (normally closed), normally open relay contacts CR–11L, limit switch LS–11 (normally closed), normally closed relay contacts CR–18L and a solenoid coil SOL–6. Solenoid coil SOL–6 is mechanically connected to air valve 162 to provide the proper directional control to the compressed air for operating air motor 44. In line 90, a pair of normally open relay contacts CR–10L are connected in parallel with limit switch LSPB–2 and control relay contacts CR–11L (line 91). Connected in parallel with control relay contacts CR–10L of line 90, are normally open relay contacts CR–12L, CR–16, and CR–26L (lines 93, 92, and 91). Also, in line 93, are a pair of normally open relay contacts CR–14 connected between the junction of contacts CR–12L and CR–16 (lines 93 and 92) and normally closed relay contacts CR–18L and solenoid SOL–6 (line 91). Solenoid SOL–6 drives the air motor 44 in the "OUT" direction.

FIG. 7 discloses the compressed air schematic diagram and from the description just presented relative to the control circuit, it will be seen that little explanation is needed in the description of this diagram.

A further modification of the existing structure described thus far may be seen by reference to FIG. 3 in which is shown a plurality of bins 165 through 170 arranged in rows (as seen in the plan view). Between rows 166 and 165 is an aisle 171, and situated between bins in rows 167 and 168 is another aisle 172 and a third aisle 173 is shown between bins in rows 169 and 170. It will of course be understood that the bins are extended vertically in columns. A transfer cart 174 is shown which has a stacker 175 located thereon to move down the aisles such as aisle 171 over a pair of rails 176 and 177. Situated on the stacker, is a platform 180 which is movable laterally to move over the top of the load support platens 36 but at an elevation under the load station supporting posts 181 through 184 as seen on the right hand section. It will be obvious that the left hand load station will be identical with that of the right hand station. Four banking posts 185 through 188 are located in the path of travel of the load glide assembly as it moves outwardly away from its home position, but beyond the path of travel of the transfer cart which moves laterally across the track 24 and another track 24a. In other words, the A.L.G. air film supported apparatus extends beyond the transfer cart structure to pick-up a load which may be deposited on banking station posts 185 through 188. Thus a number of banking stations 190 through 194 may be served in addition to the one just described by having a number of fork lifts or other vehicles for depositing loads at the different banking stations and have them ready for pick-up by the A.L.G. air film supported assembly as it comes abreast of each of the banking post stations adjacent each aisle. There will of course have to be a slight modification to the control circuit just described since limit switches LSPB–1 and LSPB–2 will no longer be connected to the structure which is connected to the transfer cart. This can be easily accomplished by substituting a pair of reed switches for limit switches LSPB–1 (both sections) as found in lines 38 and 61 and controlling the reed switches by an electromagnet which would be closed by limit switches LSPB–1 (both sections) in the same manner as just described. In other words the electromagnet is located on banking post 185 and limit switch LSPB–1 (both sections) is located on banking post 187. In a similar manner, limit switch LSPB–2 in line 91 may have a reed switch substituted in its place and the limit switch would then be moved to post 188, with an electromagnet connected to post 186 to actuate the appropriate reed switch. It should also be recognized that the chain tracks 63 and 64 would be extended to the very end of channels 21 and 22 and shaft 46 would be driven to the very end of channels 21 and 22 with appropriate replacement of limit switch LS–11 to detect the outward travel of the automatic load glide structure.

OPERATION

*Initial conditions*

Before describing any of the typical operations of the A.L.G. apparatus, it will be assumed that power has been applied and is present to each of the conductors that go to the said A.L.G. apparatus and its control circuit. Furthermore, the A.L.G. apparatus will be in the "HOME" position and it will be further assumed that there is a load on the banking posts and the control of the structure is carried out through the operation of switches S–1 through S–5. While only the right hand electrical schematic is shown, it is understood that the left hand schematic is identical to that shown in the control circuit drawings and that the circuit and its accompanying structure works in the same manner.

TRANSFER OF LOAD FROM BANKING POSTS TO "HOME" POSITION

Upon depressing the start switch S–1, control relay CR–9 is energized. Since the mode of operation is such that a load is to be picked up from the banking posts, load switch S-3 (line 34) is depressed and the circuit is then broken in line 46 to control relay CR-15 and in line 49, and 50, electromagnets R.EM-1 and R.EM-2 are de-energized indicating the pallet is not ready and that the A.L.G. apparatus is not in the "HOME" position. In line 55, relay CR-10L applies power to solenoid SOL-1 which controls the lateral pallet stop and back gate causing both of them to move into the upward position. The contacts on line 65 are also closed which arms the circuit for solenoid SOL-2 for the air film frame assembly. In line 76, solenoid SOL-3 is energized which causes the air pads to be inflated. After the air pads are inflated, limit switch LS-7 (line 48) is closed which energizes control relay CR-17 to energize solenoid SOL-6 (line 91) since contacts CR-9 were closed when the start switch S-1 was depressed. Thus the air motor 44 is set in operation in the "OUT" direction. As the A.L.G. motor 44 drives the air film supported structure outwardly, when it reaches its outer limit, limit switch LS-11 (line 62) is closed which energizes control relay CR-18L. Another section of limit switch LS-11 is opened which de-energizes solenoid SOL-6 thus stopping the A.L.G. drive motor 44.

At the same time, control relay CR-18L closes its contacts in line 83 causing solenoid SOL-4 to be energized and actuate air valve 160 to deflate the air pads. Simultaneously, control relay CR-18L closes its contacts in line 65 to energize solenoid SOL-2 and cause the A.L.G. platen 36 to move upwardly. At this time, limit switch LS-6U (line 47) energizes control relay CR-16 because the platen or A.L.G. frame is in its upward position and this in turn causes solenoid SOL-3 to be energized through control relay contacts CR-10L in line 76 and control relay contacts CR-18L to cause the air pads to again be inflated. Since control relay CR-26L was energized previously (line 74) upon control relay CR-18L being energized, it therefore has its contacts in line 86 closed. When the air pads re-inflate, limit switch LS-7 is closed which in turn energizes control relay CR-17 (line 48) and the contacts on line 88 are thus closed and a path is formed through relay contacts CR-10L, CR-16, CR-26L and through CR-18L which causes solenoid SOL-5 to be energized and operate air valve 162 in a manner to start the A.L.G. drive motor 44 to move in the "IN" direction. As the A.I.G. structure moves inwardly, it eventually reaches the "HOME" position, where the pallet or material-unit strikes limit switches LS-8, LS-9, and LSPF, closing all of these switches and thus closing the circuit to control relay CR-19 (line 54) and its locking or latching circuit (line 53). In line 84, upon energizing control relay CR-19, the contacts are closed thus causing solenoid SOL-4 to be energized and change the operation of air valve 160 to deflate the air pads. At the same time, in line 65, control relay contacts CR-19 which are normally closed, are open, thus causing solenoid SOL-2 to be de-energized and change the operation of air valve 155 which moves the A.L.G. platen 36 to a downward portion. It will be recognized that this operation positions the pallet or material-unit at the load station and the pallet is then in the "HOME" position. As the air bags are deflated, control relay CR-19 contacts in line 87 remain closed causing solenoid SOL-5 to remain energized and drive the A.L.G. further towards the "IN" position until it reaches limit switch LS-13 (line 45) which is closed and thus energizes control relay CR-14 to break the circuit in line 88 to solenoid SOL-5 and air valve 162 stopping the inward movement of the A.L.G. Since control relay CR-18L was mechanically latched (line 35) energizing control relay CR-14 in turn energizes unlatch control relays CR-10UNL, CR-26UNL, and CR-12UNL thus dropping out their corresponding latching relays. Upon dropping out control relay CR-10, solenoid SOL-1 is de-energized which causes the lateral pallet stop to drop and allows the back gate to fold rearwardly and downwardly. In line 46, limit switches LS-6D, LSBG, and LSPS are all closed and control relay contacts CR-14 are closed, thus energizing control relay CR-15 which provides the load station "HOME" signal (line 50). Since control relay CR-19 has its contacts closed in line 49, the load ready signal is applied through electromagnet R.EM-1 and the stacker is ready for a pick-up of the load from the load station.

UNLOAD CYCLE

This mode of operation is directed primarily to transferring the load from the load station onto the banking posts such as following a mode of operation where the load is placed at the "HOME" station by the stacker lateral platform. Since reed switch RS-11 in line 44 is closed, control relay CR-13 is energized which has a pair of contacts in line 38 that are closed and upon depressing the unload switch S-4, control relay CR-11L is energized. In line 46, relay contacts CR-11L are opened and control relay CR-15 is de-energized which in turn de-energizes the load station ready solenoid R.EM-2 (line 50) and the load ready solenoid R.EM-1 (line 49). In line 56, control relay contacts CR-11L close and energize solenoid SOL-1 which controls air valve 150 causing the lateral pallet stop 111 and the back gate 140 to rise and swing into position. At this time, control relay contacts CR-11L on line 61 are closed, arming the circuit to control relay CR-18L. In line 66, relay contacts CR-11L are closed which in turn energize solenoid SOL-2 which controls air valve 155 causing the A.L.G. platen 36 to move upwardly. In line 79, contacts CR-11L are closed and energize solenoid SOL-3 which controls air valve 160 causing the air pads to be inflated. As the pads are inflated and reach their point of raising the load and the pad platform from the floor or surface over which the A.L.G. unit will travel, limit switch LS-7 (line 48) is closed and energizes control relay CR-17 which in turn opens the circuit to solenoid SOL-3 leaving the air valve 160 in its present position to allow compressed air to be fed to the air pads. In line 89 and 91, control relay contacts CR-11L are closed. The contacts in line 91 close the circuit to solenoid SOL-6 which causes the air valve 162 to direct the air to air motor 44 in such a manner that the platform of A.L.G. device 34 is driven outwardly towards the banking posts. As the pallet moves outwardly, and reaches the bakning posts, limit switch LSPB-1 is closed (line 61) which energizes control relay CR-18L creating a signal that the platform is in its most outward position. At the same time, the other limit switch in the outboard banking post LSPB-2 is opened (line 91) and solenoid SOL-6 is de-energized which causes air valve 162 to shut-off the air to air motor 44. In line 83, control relay contacts CR-18L are closed forming an electrical path to solenoid SOL-4 through CR-11L and CR-16 (which is energized because the frame is up) and the air pads are deflated. This movement then sets the load on the banking posts and allows the platen 36 to be slightly below the pallet or material-unit. When the normally closed relay contacts CR-18L are opened in line 66, solenoid SOL-2 is de-energized causing air valve 155 to cut-off the air supply to the A.L.G. platen cylinder allowing the platen to move downwardly. As the air pads start to deflate, limit switch LS-7 (line 48) is opened which de-energizes control relay CR-17 and the normally closed relay contacts CR-17 in line 77 energize solenoid SOL-3 causing air valve 160 to again allow compressed air to inflate the air pads for the inward movement. At the same time, in line 74, control relay CR-26L is energized through the normally closed relay contacts CR-17. Thus the contacts in line 89 are closed with the closing of control relay CR-17, and solenoid SOL-5 is again energized causing air valve 162 to direct compressed air to air motor 44 and cause it to drive the platform towards the "HOME" station or in the "IN" direction. As the A.L.G. platform moves inwardly, limit switch LS-13 is closed (line 45) at the "HOME" position which in turn energizes control relay CR-14. Upon control relay CR–14 being energized, normally closed contacts CR–14 in line 88 are opened which de-energize solenoid SOL–5 causing the A.L.G. motor 44 to stop driving in the "IN" direction. In line 80, closing of contacts CR–14 completes the circuit to solenoid SOL–4 (line 80) which causes air valve 160 to be energized and deflate the air pads. In line 40, closing of contacts CR–14 energizes the unlatch control relay CR–11L which de-energizes the mechanically latched relay CR–11L. In line 56, opening relay contacts CR–11L de-energize solenoid SOL–1 which in turn operates air valve 150 to cut off the compressed air to air cylinders 120, 141 and 142 which drop the lateral pallet gate and causes the back gate to swing downwardly to its unenergized position. In line 64, closing contacts CR–14 energize unlatch control relay CR–18UNL which de-energizes the mechanically latched relay CR–18L. When the platen 36 dropped, limit switch LS–6D (line 46) was closed, when the back gate dropped, limit switch LSBG was closed and when the pallet stop dropped, limit switch LSPS was closed, thus energizing control relay CR–15 which in turn closes the circuit to the load station ready electromagnet R.EM–2 (line 50) indicating the "HOME" station is again ready to receive a material-unit from the stacker if a deposit is to be made.

RECYCLE MODE

On occasion it may be necessary to resquare or align the pallet load after it has been desposited for a pick-up by the stacker. The important aspect of this mode of operation is to cause the platform to move outwardly beyond the position at which it is resting with respect to the pallet or material-unit so that when the motor drives the pallet back into the pallet stop and back gate, it is properly positioned before the compressed air to the A.L.G. motor is cut-off. The recycle mode is designed to reindex the platen about two inches further in an outwardly direction with respect to the pallet in a manner such that repeated "Recycles" will move the pallet toward the back gate in increments of two inches.

It should be remembered that control relay CR–13 (line 44) is energized at this time and therefore contacts CR–13 in line 42 are closed. Upon depressing the recycle switch S–5, control relay CR–12L is energized and the contacts in line 77 complete the circuit to solenoid SOL–3 through relay CR–4 contacts (the relay is energized) and the normally closed contacts of relay CR–17 to inflate the air pads. Closing relay contacts CR–12L in line 57, completes the circuit to solenoid SOL–1 causing air valve 150 to be actuated to provide compressed air to the lateral pallet stop gate 111 and the back gate 140 to swing into their actuated positions. When the air pads are sufficiently inflated, limit switch LS–7 is closed (line 48) and control relay CR–17 is energized. The air motor is energized to move outwardly by means of relay contacts CR–17 in line 38, and contacts CR–12L and CR–14 in line 93, the A.L.G. moving approximately two inches before limit switch LS–13 (line 45) is opened, causing the air motor 44 to stop driving since control relay CR–14 is de-energized. De-energizing relay CR–14 causes the relay contacts in line 67 to close and energize solenoid SOL–2 to move the A.L.G. platen 36 upwardly. At the same time, re-energizing control relay CR–14, energizes solenoid SOL–4 through the normally closed contacts in line 81, to deflate the air pads. When the pads have deflated to the point of opening limit switch LS–7 in line 48, relay CR–17 is again de-energized. Upon de-energizing relay CR–17, control relay CR–26L (line 74) is energized and closes its contacts in line 92. When the air film supported frame moves upwardly, limit switch LS–6U is closed (line 47) energizing control relay CR–16 which in turn completes the circuit in line 77 through normally closed relay contacts CR–17 to solenoid SOL–3 controlling air valve 160 to supporly compressed air to the air pads and inflate the air pads. Upon the air pads being inflated, limit switch LS–7 (line 48) is closed which energizes control relay CR–17 forming a circuit in line 88 and line 91 through control relay contacts CR–12L in line 93 and CR–16 to energize solenoid SOL–6 controlling air valve 162 and supplying compressed air to air motor 44 causing it to move in the outwardly direction. Control relay CR–26L remains mechanically latched after relay contacts CR–17 open in line 74. As the A.L.G. structure moves outwardly, and shaft 46 trips limit switch LS–12 (line 63) the limit switch is closed which energizes control relay CR–18L. Upon control relay CR–18L being energized, its normally closed relay contacts in line 91 are opened which de-energizes solenoid SOL–6 and thus stopping the air motor 44 from driving the A.L.G. structure outwardly. In line 88, upon control relay CR–18L being energized, it immediately energizes solenoid SOL–5 and thus reverses the direction of drive of the A.L.G. motor 44, causing it to drive the A.L.G. structure in the "IN" direction. As the pallet strikes limit switches LS–8, LS–9 and LSPF, control relay CR–19 is energized which arms the load ready electromagnet R.EM–1 in line 49. Upon relay CR–19 being energized, the contacts in line 84 are closed and energize solenoid SOL–4 which causes air valve 160 to shut-off the flow of compressed air and the air pads are deflated causing the pallet to be deposited at the "HOME" station. In line 65, energizing control relay CR–19 breaks the circuit to solenoid SOL–2 controlling air valve 155 and cylinder 100 which causes the load glide platen 36 to move downwardly. While the air pads are deflating, the A.L.G. drive motor 44, causes the A.L.G. platform structure to drive to the most inward position where it trips limit switch LS–13 (line 45) which in turn energizes control relay CR–14 which breaks the circuit in line 88 to solenoid SOL–5 controlling air valve 162 thus stopping the driving motion of the A.L.G. motor 44. When control relay CR–14 is energized, the contacts on line 35 energizes unlatch control relays CR–10UNL, CR–26UNL and CR–12UNL because control relay CR–18L remains in the mechanically attached state. Also, in line 64, closing relay contact CR–14 energizes unlatch control relay CR–18UNL thus dropping out control relay CR–18L which was mechanically latched. When relay contacts CR–12L (line 57) were opened by de-energizing control relay CR–12 by the unlatch control relay, solenoid SOL–1 was de-energized which actuates air valve 150 to cut-off compressed air to cylinders 120, 141, and 142 thus deactivating the lateral pallet stop 111 and back gate 140. In line 46, limit switch LS–6D which is closed when the platen is at its lowermost position, and limit switch LSBG which is closed when the back gate is down, and limit switch LSPS which is closed when the lateral pallet stop is down, are all closed and since relay CR–14 is closed, control relay CR–15 is energized. Upon closing, control relay contacts CR–15 in line 49, and because control relay CR–19 is energized, the load station ready electromagnet R.EM–2 (line 50) and the load ready electromagnet R.EM–1 (line 49) are energized, the stacker receives the proper interconnection signals to allow a pick-up from the "HOME" station.

The foregoing description of the A.L.G. apparatus and method of operating the same illustrates an embodiment of the invention pointing up the important features thereof. The advantages that exist in being able to maneuver a heavy load with ease such as shown and described herein making use of the thin air film are quite apparent. It will also be apparent that a definite advantage exists in being able to transfer the load at the load station with the transfer cart between aisles. It will also be apparent that definite advantages exist in having the banking posts beyond the point of travel of the transfer cart so that a number of banking stations may be loaded independent of the position of the transfer cart with respect to the different aisles.

It will, of course, be understood that various changes may be made in the form, details, arrangement and proportions of the parts without departing from the scope of my invention. For example, the A.L.G. platen 36 may be moved upwardly with a load upon it by reinforcing the structural members such as cylinder 100 and the arms and linkages driven thereby. In fact it may be modified by replacing the arms and linkages by additional air cylinders which are operably secured between platform 35 and platen 36 and upon being actuated, cause the platen 36 to move vertically upward.

What is claimed is:

1. A method of operating apparatus for handling material-units between a banking station and a material-unit support station having a first mechanism supported by an air film cushion for moving horizontally and vertically a limited amount with a second mechanism carried by the first mechanism for moving vertically a limited amount, said method comprising the steps of:
   raising the second mechanism to its highest vertical position;
   raising the first mechanism to its highest vertical position by activating the air film cushion to pick-up a material-unit from the material-unit support;
   moving the first mechanism and material-unit horizontally until the material-unit is above the banking station;
   lowering the first mechanism by inactivating the air film cushion to its lowest vertical position to deposit the material-unit on the banking station;
   lowering the second mechanism to its lowest vertical position;
   raising the first mechanism to its highest vertical position by activating the air film cushion;
   moving the first mechanism horizontally from the banking station to the material-unit support; and
   lowering the first mechanism to its lowest vertical position by inactivating the air film cushion after the horizontal movement is finished.

2. A method of operating apparatus for moving material-units to and from load stations constructed to support material-units at said load stations and having an air film cushion supported device with a vertically movable material-unit support platform thereon, said method comprising:
   horizontally moving the device under a material-unit supported at a load station while the air film cushion is activated to support said device;
   lowering the device by inactivating the air film cushion;
   raising the platform to a position at a selected distance from the material-unit;
   raising the device by activating the air film cushion to support the material-unit with said device; and
   moving the device from the load station to move the material-unit while the air film cushion is activated.

3. A method according to claim 2 wherein said selected distance is selected to be less than the vertical distance of movement of the device resulting from activating the air film cushion.

4. A method according to claim 2 also comprising:
   horizontally moving the device from said load station to a second load station while the air film cushion is activated;
   positioning the device and material-unit as said device moves into the second load station to place said material-unit at a selected position; and
   lowering the device by inactivating the air film cushion to deposit the material-unit at the second load station in the selected position.

5. A method according to claim 2 also comprising:
   horizontally moving the device and material-unit to a second load station;
   lowering the device to its lower position by inactivating the air film cushion to deposit the material-unit at the second load station;
   lowering the platform to its lower vertical position;
   raising the device to its higher vertical position by activating the air film cushion; and
   horizontally moving the device from the second load station.

6. A method according to claim 5 also comprising aligning the material-unit to a selected placement at the second load station as the device with said material-unit moves into position at said second load station.

7. A method of operating a material handling system for moving material-units having a transfer vehicle; a first load station on the transfer vehicle adapted to support material-units at a position readily available to material handling devices external of the material handling system; a second load station on the transfer vehicle adapted to support and carry material-units at a position adapted to facilitate handling material-units within the system; a load carrying device and air means for supporting said device with an air film cushion, said device operative to take a higher vertical position when said air means is activated to support said device with said air film cushion and a lower vertical position when said air means is inactivated and said device is not supported by said air film cushion; and a platform on the device adapted to support a material-unit and vertically movable to a higher and lower position, said method comprising the steps of:
   moving the device under a material-unit supported at the first load station while the air means is activated to support said device;
   lowering the device by inactivating the air means;
   raising the platform to a position near the material-unit at a selected distance from said material-unit;
   raising the device by activating the air means to support the material-unit; and
   horizontally moving the device from the first load station to move the material-unit while the air means is activated.

8. A method according to claim 7 also comprising:
   horizontally moving the device and material-unit while the air means is activated from the first load station to the second load station;
   lowering the device to its lower vertical position by inactivating the air means to deposit the material-unit at the second load station;
   lowering the platform to its lower vertical position;
   raising the device to its higher vertical position by activating the air means; and
   horizontally moving the device from the second load station.

9. A method according to claim 7 also comprising:
   activating the air means while the transfer vehicle is moving.

10. A method according to claim 7 also comprising:
    horizontally moving the device and material-unit from the first load station to the second load station;
    lowering the device to its lower vertical position by inactivating the air means to deposit the material-unit at the second load station;
    lowering the platform to its lower vertical position; and picking up the material-unit for transfer within the system.

11. Apparatus for handling material-units comprising:
    a load carrying mechanism supportable by an air film cushion and movable horizontally while supported by said air film cushion and movable vertically by activating and inactivating said air film cushion;
    a vertically movable mechanism carried by said load carrying mechanism for extending said load carrying mechanism vertically;
    a load station constructed and arranged to support the material-unit for pick up or deposit thereat by said load carrying mechanism by selectively activating and inactivating the air film cushion and selectively extending the vertically movable mechanism and adapted to operatively cooperate with an auxiliary material handling mechanism;

driving means operably connected to said load carrying mechanism and said vertically movable mechanism for producing the respective movements thereof; and control means operably connected between said driving means and said load carrying mechanism and said vertically movable mechanism for energizing and de-energizing said driving means.

12. The invention as set forth in claim 11 wherein said load station includes:

a back gate disposed at the load station in the path of horizontal movement of said load carrying mechanism to align the material-unit with a predetermined reference upon encountering the material-unit.

13. The invention as set forth in claim 12 including:

a compressed air source including air pad means disposed under said load carrying mechanism for producing a thin film of air, said thin film of air cooperating with a surface over which it moves to support said load carrying mechanism.

14. The invention as set forth in claim 13 wherein:

said control means includes means for controlling said compressed air source and the thin film of air to direct the movement of said load carrying mechanism.

15. Apparatus for moving a material-unit to and from a load station adapted to support material-units comprising:

a load carrying device and air means for supporting said device with an air film cushion, said device operative to rise a determinable distance when said air means is activated to support said device with said air film cushion, a platform on the device vertically movable to a higher and lower position with said higher position selected to effect lifting of said material-unit from the load station upon activation of the air means; and means for moving the device to and from the load station when the air means is activated and thereby move the material-unit to and from said load station.

16. An apparatus according to claim 15 wherein said means for moving the device comprises a mechanical linkage between said device and said load station.

17. Apparatus for moving a material-unit according to claim 15 wherein said higher position of said platform is selected to place said platform within a selected distance from the material-unit when said material-unit is at the load station and said lower position of said platform is selected to provide a selected clearance between said platform and said material-unit when said material-unit is at said load station and said platform is at said lower position.

18. Apparatus for moving a material-unit according to claim 15 wherein said selected distance is less than the determinable distance of rise of said device when the air means is activated.

19. Apparatus for moving a material-unit according to claim 15 also comprising means for aligning the material-unit at the load station when said material-unit is being moved to said load station by controlling the horizontal movement to said load station.

20. A material handling system for moving material-units comprising:

a transfer vehicle;

a first load station adapted to support material-units at a position readily available to material handling devices external of the material handling system;

a second load station on the transfer vehicle;

a load carrying device and air means for supporting said device with an air film cushion, said device operative to take a higher vertical position when said air means is activated to support said device with said air film cushion and a lower vertical position when said air means is inactivated and said device is not supported by said air film cushion;

a platform on the device adapted to support a material-unit and vertically movable to a higher and lower position with said higher position selected to place the platform within a distance from the bottom of a material-unit when said material-unit is supported at a load station less than the vertical movement of said device between the higher and lower position of said device and with said lower position selected ot provide a selected clearance between said material-unit and said platform when said material-unit is at a load station and said platform is at the lower position; and means for moving the device to and from the load stations when the air means is activated.

21. A system according to claim 20 wherein said system also comprises a bin forming structure with aisles therebetween and wherein:

said transfer vehicle is movable along the ends of the aisles, said first load station is on the transfer vehicle, and said transfer vehicle is adapted to carry a vehicle adapted to transfer material-units between the second load station and the bins.

22. A system accoding to claim 21 wherein said first load station is connected to and supported by the transfer vehicle and extends away from the main structure of said transfer vehicle.

23. A system according to claim 22 wherein said first load station is structurally constructed to safely support a material-unit only when the transfer vehicle is not moving.

24. A material handling system according to claim 20 also comprising a bin structure formed in columns and rows with a plurality of aisles therebetween, and wherein:

said transfer vehicle is movable along the ends of the aisles and is adapted to receive a stacker vehicle adapted to transfer material-units between said transfer vehicle and the bins;

said first load station is adapted to support material-units at a position readily available to material handling devices external of the material handling system;

said second load station is adapted to support and carry material-units at a position constructed to facilitate handling by the stacking vehicle; and said lower position of the platform is selected to provide a clearance between said platform and material-unit when said platform is at said lower position sufficient to enable pickup of said material-unit by the stacker vehicle when said material-unit is at the second load station.

25. A material handling system according to claim 20 wherein said device is engaged with said transfer vehicle and said system also comprises means for activating the air means when the transfer vehicle is moving.

References Cited

UNITED STATES PATENTS

| | | |
|---|---|---|
| 3,124,209 | 3/1964 | Flipse. |
| 3,182,823 | 5/1965 | Chasar _____ 214—16 |
| 3,209,929 | 10/1965 | Petersen et al. _____ 214—1 X |

ROBERT G. SHERIDAN, *Primary Examiner.*

U.S. Cl. X.R.

214—152; 254—93

UNITED STATES PATENT OFFICE
CERTIFICATE OF CORRECTION

Patent No. 3,445,009                                       Dated May 20, 1969

Arthur R. Burch

It is certified that error appears in the above-identified patent and that said Letters Patent are hereby corrected as shown below:

Column 8, line 38, after "open" and before "con-" insert --relay--.
Column 11, line 44, "A.1.G." should read -- A.L.G. --; line 57, "portion" should read --position--. Column 12, line 44, "bakning" should read --banking-
Column 13, line 45, "CR-4" should read --CR-14--; line 62, "re-energizing" should read --de-energizing--; line 74, "supporly" should read --supply--.
Column 14, line 39, "attached" should read --latched--.

Column 18, Claim 22, line 28, "accoding" should read --according--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents